UNITED STATES PATENT OFFICE.

ANTONIO PELLETIER, OF WASHINGTON, DISTRICT OF COLUMBIA.

COMPOUND FOR ARTIFICIAL STONE.

SPECIFICATION forming part of Letters Patent No. 266,878, dated October 31, 1882.

Application filed August 17, 1882. (No specimens.)

*To all whom it may concern:*

Be it known that I, ANTONIO PELLETIER, a citizen of the United States, residing at Washington, in the District of Columbia, have invented certain new and useful Improvements in Compounds for Artificial Stone; and I do declare the following to be a full, clear, and exact description of the invention, such as will enable others skilled in the art to which it appertains to make and use the same.

This invention relates to certain improvements in compounds or cements for the construction of artificial stone and other like purposes; and I do hereby declare that the following is a full, clear, and exact description thereof.

To enable others skilled in the art to which my invention appertains to make and use the same, I will proceed to describe it.

In preparing my improved material I first make a suitable cement from material which, upon heating, gives rise to its formation—namely, sulphate of alumina or other cheap salts of alumina or aluminous materials—such as feldspar, granite, furnace-slags, &c.—together with oyster-shell or other gas-house lime, (dolomite limestone.) I then mix the prepared cement with silicious sand and oxide of iron or other metallic salt, with sal-ammoniac or chloride of any suitable mineral, or the sesquichloride of iron in any suitable proportions, with water sufficient to form a mass of suitable consistency.

The proportions may be varied as occasion or the nature of the work requires; but I have found the following to answer well for general purposes, viz: cement composed of sulphate of alumina or other cheap salts of alumina or aluminous materials—such as feldspar, granite, furnace-slags, &c.—together with oyster-shells or other gas-house lime, (dolomite limestone,) one part; silicious sand, two parts; oxide of iron or other metallic oxide, one part. This I mix and use as a base for the manufacture of artificial stone. The sal-ammoniac or other chlorides and the sesquichloride of iron, in about equal parts or other suitable proportions, are combined with water in about the proportion of one part of sal-ammoniac or other chloride to about one-fiftieth part of sesquichloride of iron.

Instead of the cement prepared as above set forth, I may use English, Portland, or hydraulic cement without changing the spirit of my invention. The first-mentioned ingredients above described—viz., the cement prepared as described, sand, and metallic oxide—are thoroughly mixed by any suitable means and a sufficient quantity of the last-mentioned chloride or compound chloride solution added to form a highly-plastic mass, which may be molded into blocks of various sizes and shapes, or which may be applied as a coating for wood, walls of various descriptions, to roofs, and to innumerable other purposes where a durable and hard surface or body is required. The plastic mass will dry rapidly and become as hard as a rock, and will render articles to which it is applied not only thoroughly water-proof, but fire-proof as well.

Having thus described my invention, what I claim, and desire to secure by Letters Patent, is—

1. The chloride or compound chloride solution, adapted to be combined with a hydraulic cement, sand, and a metallic oxide, substantially as specified.

2. The compound consisting of the cement prepared as described, silicious sand, oxide of iron or other metallic oxide with sal-ammoniac and corresponding sesquichloride and water combined, substantially as specified.

3. The compound solution for mixing, employed to render plastic the material for the formation of artificial stone, consisting of chloride of ammonia or other suitable chloride and corresponding sesquichloride, substantially as specified.

In testimony whereof I affix my signature in presence of two witnesses.

ANTONIO PELLETIER.

Witnesses:
J. R. NOTTINGHAM,
CHAS. P. WEBSTER.